Jan. 31, 1967   H. E. BERGNA ETAL   3,301,635
MOLDED AMORPHOUS SILICA BODIES AND MOLDING
POWDERS FOR MANUFACTURE OF SAME
Filed July 1, 1965
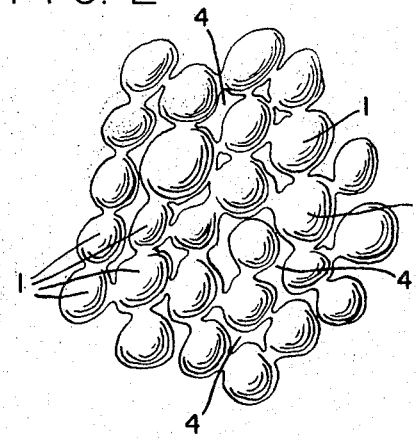
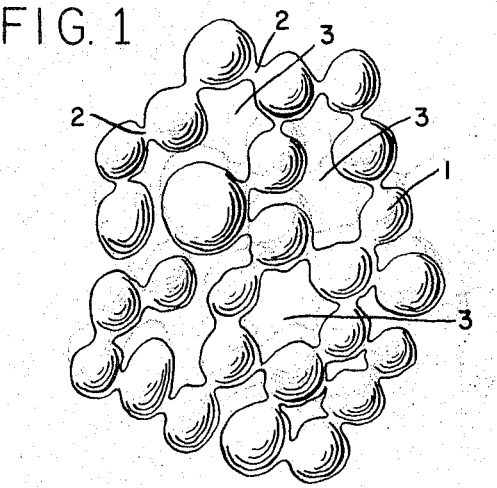
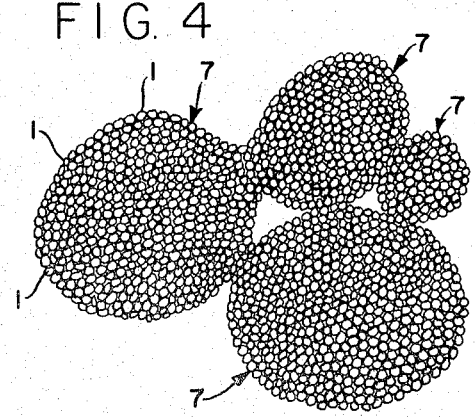
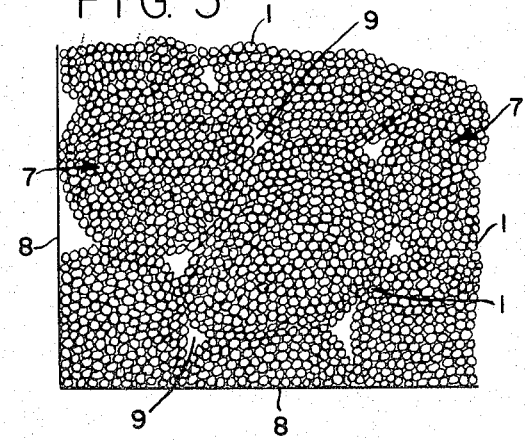
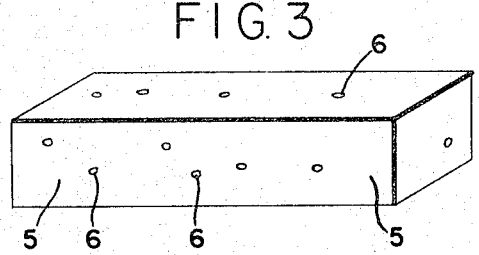
INVENTORS
HORACIO E. BERGNA
FRANK A. SIMKO, JR.
BY  *Fred C. Carlson*
ATTORNEY United States Patent Office 3,301,635
Patented Jan. 31, 1967

3,301,635
MOLDED AMORPHOUS SILICA BODIES AND
MOLDING POWDERS FOR MANUFACTURE
OF SAME
Horacio E. Bergna, Wilmington, Del., and Frank A.
Simko, Jr., Cedar Grove, N.J., assignors to E. I. du
Pont de Nemours and Company, Wimington, Del., a
corporation of Delaware
Filed July 1, 1965, Ser. No. 470,338
14 Claims. (Cl. 23—182)

This application is a continuation-in-part of application Ser. No. 68,418, filed November 10, 1960, now abandoned.

This invention relates to strong, anhydrous, amorphous silica bodies and to their manufacture by molding and sintering amorphous colloidal silica powders at a temperature of at least 1000° C. but below the devitrification temperature of the molded bodies.

The invention is particularly directed to a process for making amorphous silica bodies having a density of from 91 to 100% of the theoretical density of amorphous silica, by compacting aggregates of amorphous silica ultimate particles substantially free of non-volatile constituents other than silica, said aggregates having a particle size in the range from 0.1 to 50 microns, said powder having a tapped bulk density of at least 0.2 gram per cubic centimeter, the ultimate amorphous silica particles being spheroidal and substantially uniform in size, as observed by electron microscopy, being dense, having a coalescence factor of less than about 30%, and having an average diameter of from 5 to 300 millimicrons, the powder being compacted under pressure to a uniform density of at least about one gram per cubic centimeter, and heating the compacted material at a temperature above 1000° C. but below the devitrification temperature of the material, until the density of the resulting body is increased to at least 2.0 grams per cubic centimeter, and cooling before any cristobalite is formed by devitrification of the amorphous silica.

The invention is more particularly directed to a process for making unusually strong amorphous silica bodies containing interconnecting macropores uniformly distributed throughout the structure, the process being identical to that described above, but with the further limitations that the ultimate amorphous silica particles in the aggregates have a coalescence factor of from 10 to 30% the average diameter of the aggregates is at least 10 times the average diameter of the ultimate amorphous silica particles, the compaction of the powder is stopped while spaces still remain between the aggregates, these spaces having an average diameter of at least twice that of the diameter of the ultimate silica particles, and the heating is continued until the density of the sintered body is in the range from 91 to 99% of the theoretical density of amorphous silica.

The invention is also directed to a process for making translucent to transparent anhydrous amorphous silica bodies substantially free from crystalline silica and substantially free from porosity, the density of the bodies ranging from 99 to 100% of the density of amorphous silica, the process being identical to that first described above, but with the further limitations that compaction of the powder is continued until there remain essentially no spaces between the aggregates, and the compacted material is heated until a dense, transparent, amorphous silica body having a density greater than 99% of theoretical is obtained. Also in this process it is preferred that the aggregates consist of ultimate silica particles having a coalescence factor of less than 10%.

The invention is additionally directed to novel opaque anhydrous amorphous silica bodies substantially free of crystalline silica and non-volatile constituents other than silica, characterized by having a strength greater than that of 100% dense, transparent amorphous silica, the density of the bodies being in the range from 91 to 99% of the theoretical density of amorphous silica, the major proportion of the porosity being present in the form of interconnecting pores of from 20 to 5000 millimicrons in average diameter and preferably between 40 and 1000 millimicrons in average diameter, the pores being of such uniform size that at least 50% of the pores have a diameter between 0.5 and 2.0 times the average pore diameter and essentially no pores are more than 5 times the average diameter, the pores being uniformly distributed throughout the body, as observed by electron microscopy. In the most preferred bodies of the invention, the macropores have an average diameter of between 100 and 500 millimicrons, the density lies between 95 and 98% of theoretical, and the silica has a purity of at least 99.4%.

The invention is also directed to a silica powder preferred for use in the process of this invention, the particles of which consist of aggregates of dense amorphous silica ultimate particles substantially free from non-volatile constituents other than silica, the aggregates being spheroidal in shape, having an average diameter of 0.5 to 50 microns, the powder consisting of such aggregates, having a tapped bulk density greater than 0.2 gram per cubic centimeter, the ultimate particles being spheroidal and substantially uniform in size as observed by electron microscopy, being dense, having a coalescence factor of less than 30%, and having an average diameter of at least 5 but less than 300 millimicrons, preferably less than 200 millimicrons, and even more preferably less than 50 millimicrons.

The processes and compositions of this invention are concerned with amorphous silica, in contradistinction to crystalline silica, hereinafter sometimes referred to as cristobalite. Such terms as fused silica, vitreous silica, vitrified silica, and fused quartz have often been used interchangeably to describe amorphous silica bodies. The presence of crystallinity in a silica body is readily ascertainable by such standard techniques as studying an X-ray diffraction pattern of the silica body.

Amorphous or "fused' silica has long been recognized as a very valuable material of construction, especially for use at elevated temperatures, because it has great strength and a coefficient of expansion so low as to make it resistant to thermal shock. On the other hand, lack of practicable means of fabrication has impeded its widespread use even in view of its outstanding properties.

Conventional methods for fabricating fused silica hitherto have involved heating the silica above its softening point (above 1700° C.), casting it into the desired shape, and then quickly chilling it through the temperature range at which conversion of the amorphous form to the crystalline form (devitrification) will occur. Shaping of the silica at the extremely high temperatures above the softening point is very difficult and not well adapted to the preparation of intricate shapes or indeed of any shapes other than rudimentary and simple forms. It will also be apparent that at such high temperatures corrosion and erosion of molds and other shaping means is very rapid.

In the method just described there is also always present the danger that the shaped article will not be cooled sufficiently rapidly to avoid some devitrification. This difficulty is inherent in the fact that the molding temperatures used are so high. Any devitrification, of course, seriously detracts from the strength of the shaped article and decreases its resistance to thermal shock.

The present invention provides novel amorphous silica bodies substantially free of crystallinity and novel methods for their production which avoid the necessity of heating the silica above its minimum devitrification temperature which is around 1200°–1300° C. The processes utilize amorphous silica powders having certain essential characteristics which make them capable of being shaped into desired forms by compaction and being sintered to produce strong bodies without devitrification. In the molding powders used in the process of this invention the amorphous silica is present in the form of aggregates of dense ultimate spheroidal particles in the size range of about 5 to about 300 millimicrons. These ultimates, by reason of their methods of preparation, are so lightly coalesced as to lend themselves to compaction to such a degree that articles made by sintering the shaped compacts can have a density approaching or equal to theoretical.

The size and shape of the aggregates is of importance. Aggregates having an average diameter in the range from 0.1 to 50 microns may be employed. Uniformity of size of the aggregates in the preferred size range becomes more critical with increasing strength of the aggregates, i.e. with increasing coalescence of the ultimate particles within the aggregates. It is also more critical in making the unusually strong, opaque bodies than in making the dense, translucent to transparent bodies.

The process of this invention may be employed to produce extremely dense, non-porous amorphous silica bodies having a density greater than 99 and even as high as 100% of theoretical, such bodies being translucent to transparent like the shaped vitreous silica bodies of the prior art. The process may also be employed to produce a novel body of amorphous silica, having a density of from 91 to 99% of theoretical, wherein there are interconnected macropores, the presence of which is accompanied by unusually high strength in the silica body. Such bodies are from 1.5 to 3 times stronger than conventional commerical fused silica, or "fused quartz" when specimens are cut and tested by the same method.

By the term "macropores," we distinguish pores larger than 20 millimicrons from the "micropores" in conventional silica gel which are generally smaller than about 20 millimicrons in average diameter, and more commonly 5 millimicrons or smaller. It is a theory of the invention that these channel-like macropores are presumably acting either as regions for the relief of internal stresses, or as cavities to stop the propagation of cracks when the sample is placed under a breaking load. It is ordinarily supposed that in ceramic bodies or in glass, porosity is a source of mechanical weakness. It is our theory, however, that in the case of pores such as those in the silica bodies of the present invention, which are continuously interconnected in three dimensions, and where these pores make up a network of fine channels, and where they are evenly distributed in three dimensions throughout the silica body, then in this situation, a small degree of porosity ranging from about 1% to about 10% is beneficial. It is theorized that such pores improve the mechanical strength of the body. This hypothesis or theory is supported by the fact that as the bodies of this invention are being sintered at high temperature, those specimens which are cooled and tested while they still contain a degree of porosity ranging from 1 to 9% by volume are considerably stronger than those which have been further fired until the porosity has been essentially reduced to zero.

The particular type of aggregate powder to be employed in the process of this invention is selected with regard to which type of molded silica body is to be produced—either the essentially translucent body with a density greater than 99% of theoretical, similar to fused silica bodies of the prior art, or the novel pore-reinforced, relatively opaque molded silica body of the invention. For the first-mentioned type of dense, translucent silica body, the type of aggregate powder selected is such that when molded under pressure there will remain between the aggregates substantially no pores or macropores larger than the pores between the ultimate particles within the aggregates. On the other hand, to provide a pore-reinforced body, the type of aggregate is selected so that after the powder is compressed there will remain between the aggregates, a certain degree of macroporosity which will remain in the body after it has been heated to eliminate the micropores within the aggregate. This point will be further described in relation to the drawings.

The small size of the ultimate particles is an important requisite for an amorphous silica molding powder if it is to be used to prepare strong opaque bodies having a density greater than 91% of theoretical. The formation even of a very small amount of cristobalite by devitrification of the amorphous silica greatly weakens the body since, when it is cooled to room temperature, the cristobalite introduces severe strains in the surrounding amorphous silica. To avoid the formation of crystalline silica during fabrication it is necessary that compacts of the powder sinter rapidly to dense objects at temperatures below that at which crystalline silica begins to form at an appreciable rate. The larger the pores in the body to be sintered, the higher the temperature required. With amorphous silica powders composed of ultimate particles less than 300 millimicrons in diameter macropores are small and sintering can be readily accomplished. On the other hand, a powder consisting of coarser ultimate particles of amorphous silica of a particle size, for example, larger than a micron, which can be obtained by pulverizing fused silica glass gives a body with very large pores. This cannot be sintered to greater than 91% of theoretical density at a temperature low enough to preclude the formation of cristobalite because of the very large spaces or pores between the large particles, which cannot be eliminated at a temperature less than about 1300° C., above which devitrification becomes rapid.

The absence of strong coalescence between ultimate particles is also important in preparing dense, transparent silica bodies by the process of this invention. Aggregates having a coalescence factor of up to 30% may be employed if the amorphous silica object to be produced is to have a theoretical density of greater than 91%. However, if the product is to be translucent amorphous silica object, the porosity must be very low and the density greater than about 99% or greater than 99.5% of the theoretical value. In the latter case, the coalescence factor should be as low as possible, preferably less than 10%. If the coalescence factor is greater than about 30%, then the aggregate particles tend to be hard and are difficult to press together sufficiently to avoid leaving an excessive amount of porosity and thus result in a fired density of less than 91%.

It is important that the silica powders do not contain non-volatile impurities which catalyze crystallization. Sodium is one of the commonest impurities. The silica should be of high purity in regard to non-volatile substances, since most impurities catalyze crystallization of the silica at elevated temperature. Thus the presence of such contaminants effectively reduces the maximum temperature which can be employed for densification and formation of cristobalite is difficult to avoid, even using powders composed of ultimates having a diameter less than 300 millimicrons and a coalescence factor less than 30%.

In the drawings, which are not to scale:

FIGURE 1 is a diagrammatic view of a section of a silica molding powder showing amorphous silica spheroidal ultimate particles 1, lightly coalesced (less than 30%) at their contact points 2 to form micropore voids 3, FIGURE 2 is a similar view of a product obtained by compaction of a powder of FIGURE 1 to a density of at least 1 gram per cubic centimeter, showing the ultimate amorphous silicia particles 1 enclosing substantially uniform micropore voids of reduced volume 4, FIGURE 3 represents a solid bar 5 of amorphous silica obtained by sintering a shaped compact of FIGURE 2 at 1000 to 1200° C. until the density is between about 92 and about 99.5% of the theoretical density of amorphous silica, showing the persistence of macropores as interconnecting channels 6, FIGURE 4 shows a multiplicity of spheroidal amorphous silica powder particles 7 such as obtained by spray-drying a silica sol by a process of the invention, the individual powder particles having the structure of the aggregate of FIGURE 2 and being made up of ultimate amorphous silica particles 1, and FIGURE 5 represents a cross section of a molded body obtained by compacting the material of FIGURE 4, showing how the aggregate powder particles 7 have been crowded together into a relatively uniform structure with a micropore voids 9, lines 8 representing a portion of the mold wall.

If a powder is used which is similar to that shown in FIGURE 4, except that the ultimate particles within the aggregates have a coalescence factor of less than 10%, the macropores between aggregates in the molded body will be smaller than the voids 9 between aggregates shown in FIGURE 5. The softer aggregates are more easily compressed and more closely packed, so that the voids between the aggregates in the molded body are essentially as small as the voids between the ultimates within the aggregate particle. Upon sintering such a molded body at a temperature between 1000° C. and about 1200° C. all of the pores—those between aggregates as well as those between the ultimates—are eliminated, resulting in a transparent body having only occasional very small voids and having a density greater than 99.5% of the theoretical density of amorphous silica.

MAKING THE MOLDING POWDERS

To make an amorphous silica molding powder suitable for use in the process of the present invention one first prepares a suitable silica sol and then dries the sol under certain critical conditions which lead to products having desired properties. The sols which are suitable as starting materials and the conditions which are critical in the drying step will now be described in greater detail.

The starting sol must first of all be a dispersion of amorphous silica ultimate particles. Since the silica in the ultimate product is to be amorphous it is highly important that the silica particles in the starting sol be free of crystallinity. Methods for determining the presence of crystallinity by X-ray techniques are discussed in R. B. Sosman's "The Properties of Silica," Chemical Catalog Company, Inc., New York, 1927, page 207.

Also as observed by electron microscopy the ultimate silica particles in the sol should be uniform-sized and spheroidal. By "uniform-sized" is meant that 75% of the total number of particles have a diameter in the range from .5D to 2D, where D is the number average particle diameter. The uniform size of the particles is important in avoiding micropores in the formed articles. The uniformity of the particles can be determined by methods described in the Journal of Physical Chemistry, 57 (1953), page 932.

The size of the ultimate silica particles in the sol can also be determined by methods described in the Journal article just mentioned. For making the novel silica body of this invention, the average ultimate particle size should be in the range of 5 to 300 millimicrons, preferably between 7 and 200 millimicrons and more preferably between 13 and 110 millimicrons, in order to attain a desirable degree of coalescence. Particles larger than about 300 millimicrons when cold pressed or molded give only very weakly coherent bodies which disintegrate during handling. With particles below the preferred limit of 200 millimicrons there is no problem of obtaining coherent molded bodies.

Sols containing silica particles smaller than 5 millimicrons such as those obtained by neutralizing sodium silicate with sulfuric acid, for instance are not satisfactory because the particles tend to aggregate very rapidly and irreversibly. When such sols are freed of stabilizing ions they show rapid increase in viscosity and tend to gel in extremely short times. Accordingly sols containing ultimate silica particles larger than 5 millimicrons in average diameter are used.

The continuous liquid phase of the silica sol is preferably water—that is, the sols are aquasols. Although organosols can be used, ordinarily any advantages to be gained from the use of an organosol are more than offset by the added cost.

The art is already familiar with methods for making silica aquasols of discrete, dense amorphous silica particles in the size range above specified, and any of these methods may be used to make the starting material employed in processes of the present invention. A particularly preferred type of silica aquasol is described in United States Patent No. 2,574,902, issued November 13, 1951, to Bechtold and Snyder. This patent describes how the size of the ultimate silica particles is increased into the desired size range by adding quantities of a low molecular weight silica feed sol to a heel sol containing silica particles which have been grown substantially. To minimize the amount of alkali contained in the silica particles it is preferred to use ammonium hydroxide as the stabilizing alkali used to adjust the ratio as described in the patent.

Regardless of its method of preparation, a silica sol to be useful in the processes of this invention should be purified of all non-volatile constituents other than the silica. By "non-volatile" is meant constituents which will not be volatilized off or burned out at temperatures below or equal to the sintering temperature of the silica. Inorganic anions and cations are included among non-volatile constituents and can be removed, if soluble, by deionizing the silica sol with a mixture of anion and cation exchange resins in accordance with processes described in United States Patent No. 2,577,485, issued December 4, 1951, to J. M. Rule. The sol is preferably temporarily stabilized against gelling or aggregation of the ultimate spheroidal particles by adjusting the pH to between 8 and 9 with a volatile base such as ammonia. Alternatively, the sol may be temporarily stabilized by adjusting the pH to the range 1 to 3 with a volatile strong acid such as hydrochloric or nitric acid.

As a further alternative, the sol can be purified by such methods as dialysis and other similar methods known to those skilled in the art.

The purity of the silica powder obtained by drying the sol is important in that it must not contain substances which promote the devitrification of silica at the sintering temperature. Thus, substantial quantities of impurities such as the alkali and alkaline earth oxides are especially to be avoided and these compounds should be removed as thoroughly as possible from the sol employed in making the silica powder. Generally speaking, the total content of potassium, sodium and calcium oxides, for example, in the powder should not exceed about 0.1% and preferably less than 0.01%. The exact level depends to some extent upon whether these impurities are on the surface of the particles or are locked within the silica structure. Thus, a few hundredths of a percent of combined sodium within the particles is not as harmful as this amount of combined sodium on the surface of the particles.

It should be noted, however, that small traces of alkali metal or alkaline earth metal oxides may act to aid the sintering of the silica and permit it to occur at a lower temperature than otherwise would be possible. While the final sintered, dense, ceramic body will contain at least 99% $SiO_2$ it will be understood that trace amounts of alkali and alkaline earth metal oxides as above discussed are not excluded.

Having prepared a suitable amorphous silica starting sol, as above described, the sol is dried to a powder. The drying method and conditions employed will depend upon the degree of coalescence between the ultimate particles that can be tolerated or may be desired, and will also depend upon the size and shape of the aggregate particles to be produced. To prepare dense transparent silica bodies, powders having a low coalescence, i.e. below 30% and preferably below 10% are employed. On the other hand, to prepare the opaque bodies of higher strength which contain interconnected macropores throughout, it is permissible, in fact preferred, to employ a powder in which the aggregates are sufficiently firm and coherent that when they are compacted into a mold there will remain between the aggregates macropores of the desired size. For this purpose, therefore, aggregates in which the ultimate particles have a coalescence factor of between 10 and 30% or higher are preferred.

To prepare a silica powder having a coalescence factor of less than 30%, the sol is dried to a powder before any substantial increase has occurred in its viscosity and at a rate which is substantially instantaneous after the silica concentration in the continuous liquid sol phase approaches about 50%. After the sol has been deionized, so that stabilizing ions have been removed, it is in a metastable state and has a pronounced tendency to gel. This tendency is marked, in its incipient stages, by an increase in the viscosity of the sol, the increase being due to the individual ultimate silica particles coalescing into aggregates. Coalesced aggregates are not easily broken down when subjected to compaction, and as a result the large voids which are inherent in the compact persist into the final fired object. By quickly drying the sol this tendency is minimized and excessive aggregation may be avoided if a very dense silica body is to be made.

Whatever the method used for drying the sol, it should be one which completes the drying very rapidly—that is, practically instantaneously—after the concentration of silica has started to rise if a powder of low coalescence factor is desired. Thus, a batch drying operation wherein the sol is run into trays and water gradually evaporated off gives a powder with a higher degree of coalescence. When the concentration of silica in the liquid phase approaches about 50% the rate of aggregation of the ultimate silica particles is very rapid and the coalescence factor of products thus obained is high. The aggregate particles so obtained are of macroscopic size; indeed the dried material is often in the form of lumps of silica gel. These are far too coarse to be used directly in the process of the present invention, although the material may be suitably subdivided by grinding for making the strong opaque bodies of this invention.

Spray-drying is a preferred method for drying the sol provided the operation is conducted within the limits above mentioned. Once these limits are recognized, those skilled in the art of spray-drying will have no difficulty setting up the drying operation to accomplish the desired result.

The most important factors in this spray-drying operation are (a) the fineness of the spray droplets, which will in turn control the size of the silica aggregates in the powder, (b) concentration of silica in the sol being sprayed, it generally being desired to keep the silica concentration below the point where the viscosity will interfere with production of very fine spray droplets, (c) the temperature of the drying air, and (d) the removal of physically adsorbed water from the dried aggregate particles at relatively low temperature. Generally speaking, the conditions employed in conventional spray drying equipment will be found satisfactory, providing the powder product is removed from the heated zone as rapidly as it is dried so as to minimize coalescence of the ultimate spheroidal particles within the aggregates.

Freeze-drying is another method of converting a silica sol to a dry powder with minimum coalescence of the ultimate amorphous silica particles. In this method the sol is cooled to a low temperature and then frozen very fast as a thin film; thereafter the frozen water is sublimed. For making the strong opaque bodies of this invention containing interconnecting macropores the freeze-drying process is less preferred than spray-drying because it produces aggregates in the form of relatively large platelets many microns in diameter and several microns in thickness, this peculiar shape being the result of the concentration and aggregation of the ultimate spheroidal particles between the ice crystals at the moment of freezing. On the other hand, where the ultimate particles in the starting sol are relatively large, i.e. 50–300 millimicrons in size, the freeze-drying process results in a powder having a very low coalescence, e.g. 10% or less. Such powders, as noted above, are particularly useful in preparing the dense translucent silica bodies. An ideal powder for making dense bodies is that disclosed by G. B. Alexander "Pulverulent Silica Products," U.S. Patent 3,041,140, issued June 26, 1962. This powder, made by freeze-drying a deionized sol containing ultimate particles in the size range 50–300 millimicrons, exhibits a coalescence factor of from 0.1 to 10%. The coalescence between ultimate particles is so low in this powder that in spite of the irregular shape of the aggregates, substantially all macroscopic spaces between aggregates are eliminated upon molding, so that sintering results in a very dense, translucent amorphous silica body.

Drum-drying the sol is the least preferred procedure but can be used under suitable circumstances. In this method a thin film is applied to the surface of a rotating, heated drum and the dried residue is continuously removed as the drum rotates. This drying process is particularly applicable when the amorphous silica ultimate particles are larger than about 50 millimicrons in average diameter since these larger particles have a smaller tendency to coalesce; coalescence tends to be excessive in drum drying. Since rapid and complete removal of free water from the silica aggregates at the lowest possible temperature is essential to minimize coalescence a vacuum drum drier which will evaporate the water at a temperature not much higher than ordinary room temperature gives the best results. The particular drying procedure to be employed will be selected principally in view of the size of the ultimate spheroidal silica particles involved. Thus, for particles larger than, say, 50 millimicrons in diameter, various methods of drying can be employed. For sols in which the particles are smaller than about 50 millimicrons in diameter, it is essential that spray-drying be used to prepare the molding powder in order to avoid excessive coalescence of the ultimates. Spray drying can be employed with all sizes of spheroidal silica particles with which this invention is concerned.

The use of spray-drying becomes very important in making low-coalescence silica powder in the case of ultimate silica particles smaller than 20 millimicrons in diameter, and is especially important for particles in the range from 5 to 10 millimicrons in diameter. In the latter case one employs a sol thoroughly purified from non-volatile, ionic contaminants and the pH is in the range of 1 to 3 or 8 to 10, the lower range being obtained by acidification with a volatile acid such as nitric, and the upper range being obtained by adjustment with ammonium hydroxide. Also, the spray droplets must be exceedingly fine to permit as nearly instantaneous drying as possible and the resulting powder must be removed from the heated zone as rapidly as possible.

As will be seen from FIGURES 4 and 5 of the drawings, the substantially spheroidal silica powder particles obtained by spray-drying a sol can readily pack together with uniform continuous macropores remaining between aggregates. Due to the uniform size and spheroidal shape of the aggregates, the pores between aggregates are in the form of interconnected channels and are uniformly distributed throughout the molded compact. Upon sintering such a body the micropores between ultimate particles within the aggregates are eliminated, but the macropores between aggregates remain, resulting in the strong, opaque bodies of this invention.

CHARACTERISTICS OF THE MOLDING POWDER

In the molding powders of this invention two kinds of particles can be recognized. These are: (1) the smallest units discernible by the electron microscope, herein sometimes called "ultimate particles," consisting of dense amorphous silica and appearing in electron micrographs substantially as spheres, (2) aggregates made up of a multiplicity of the ultimate particles joined together in three-dimensional networks by siloxane (Si—O—Si) bridges.

The aggregates constitute the powder particles, and appear as separate particles when the powder is shaken in a liquid medium which deflocculates the particles, such, for example, as normal propyl alcohol. For observation, such a suspension may be diluted out to the point where the powder particles may be spread out on a surface such as a glass slide, and observed individually. In the dry state, or in suspension in non-polar liquids, such as a hydrocarbon oil, the aggregate particles may be loosely held together by Van der Waals forces, and in this clumped condition it is not possible to observe the individual aggregates or powder particles. However, if the powder is dispersed in a water-miscible alcohol or in water containing sufficient ammonia to give a pH of about 9, the clumps of aggregates are dispersed and the individual aggregates may then be observed and measured by conventional microscope methods.

The ultimate amorphous silica particles have an average size in the range of 5 to 300 millimicrons—that is, the ultimate particles size of the silica in the original sol persists through the drying step. The particle size can be easily observed in electron micrographs for ultimates larger than, say 7 millimicrons; for ultimates smaller than this, the size can be inferred from specific surface area measurements.

The aggregates in the molding powders are made up of a great many ultimate particles coalesced at their points of contact. The aggregates are generally in the range of about 0.1 to 50 microns, preferably 0.1 to 10 microns in diameter. When prepared by spray-drying a silica sol, the aggregates are from 0.2 to 5 microns in diameter; particles smaller than about 0.2 micron are difficult to collect; aggregates larger than about 10 microns tend to hollow, and as the size of these hollow spheres increases, their strength decreases and they tend to break up during compaction. However, spray-dried spheres up to 50 microns in diameter are useful.

The size of the aggregates is of less critical importance when the aggregate structure is soft and weak due to the ultimate particles having a low coalescence factor. Particularly in the case of ultimate silica particles larger than about 50 millimicrons, when the coalescence factor is less than 10%, the powder is so soft that it is difficult to determine the aggregate size, since the aggregates break apart when subjected even to mild mechanical forces. As stated above such a soft powder is useful when a 100% dense, transparent, pore-free silica body is to be prepared.

On the other hand, if the coalescence factor is in the range from 10 to 30%, the aggregates are sufficiently coherent that the aggregate size can be determined with relative ease. In this case, where the aggregates are sufficiently strong and firm to retain their individual character, the size of the aggregate particles is of importance, since this in turn, together with the degree of pressure aplied in molding, determines the size and distribution of the inter-aggregate spaces which retain their identity through the sintering process and appear in the final product as interconnected macropores distributed through the dense amorphous silica matrix. This distribution is determined by the particle size and distribution of particle sizes of the original aggregates.

The aggregate size in the silica molding powder may range from 0.1 micron to 50 microns. However, it will be apparent that in the case of aggregates having a diameter of 0.1 micron or 100 millimicrons, the ultimate particles must be much smaller than this—for example, from 5 to 25 millimicrons in diameter. This size range of the aggregate particles will be from about 4 times the diameter of the ultimate particles to 50 microns. Thus in the case of 300-millimicron particles, the aggregates will range from 1.2 microns to 50 microns, while with 5-millimicron particles the range will be from 20 millimicrons to 50 microns.

Generally speaking, when the novel macropore-reinforced silica body of this invention is produced by pressing coherent aggregates, in which the coalescence factor of the ultimate particles is from 10 to 30%, the average diameter of the reinforcing interconnected macropores in the ultimate molded silica body will be less than one-tenth the diameter of the silica aggregates in the powder originally employed. A preferred aspect of this invention is the powder from a spray-dried silica sol consisting of pheroidal aggregates from about 0.2 to $2\mu$ in diameter with most of the silica present as aggregates of around $1\mu$ in diameter, made up of ultimate silica particles about 15 millimicrons in diameter. This powder gave a remarkably strong, white, opaque, amorphous silica ceramic body containing about 3% by volume of uniformly distributed interconnected macropores about 0.1 micron in diameter, and the body was from 1.5 to 2.0 times as strong in transverse bending strength as similarly cut bars of transparent, pure, fused silica.

The size of the silica aggregates used for pure silica bodies of maximum density and low porosity is also particularly important in powders of relatively high coalescence factor. The higher the degree of coalescence of the ultimate particles in the powder aggregates, the harder the aggregate particles, the less they are deformed, and therefore the larger the spaces between the compressed but imperfectly consolidated aggregates. Thus in making the silica ceramic with minimum porosity from a powder of high coalescence factor, it is essential that the particle size of the aggregates be as small as possible, and preferably about ten times the diameter of the ultimate particles within the aggregates. Thus, for example, if colloidal silica of 15 millimicron particle size, originally stabilized with ammonia and otherwise essentially free from sodium or other cationic non-volatile impurities, is dried on a drum dryer to produce macroscopic flakes of silica, it will be necessary to pulverize this gel until the gel fragments or aggregate particles are of the order of 150 millimicrons in diameter, which is ten times the ultimate particle size. Once this is accomplished, then the powder in the form of these very fine aggregates can be compacted under pressure, so that when the aggregate particles are close-packed, the space in the interstices between the individual aggregate particles will be as small as 15 millimicrons, although some larger spaces may be present, because of imperfect packing of the aggregates.

To produce a novel silica body of unique strength, a uniform distribution of interconnected macropores of uniform size within a dense, non-porous silica matrix is the desirable objective. To achieve this, aggregates consisting of ultimate silica particles in the range of 10 to 30 millimicrons in size, in the form of aggregates about 300 to 500 millimicrons in average diameter are preferred. Due to the relatively small ultimate particle size within the aggregates, this portion of the mass is sinterable to a 100% dense, non-porous condition, with great rapidity in the temperature range of 1000 to 1200° C. At the same time, a compact or molded mass made of such aggregate particles with an average particle size of 400 millimicrons, will contain macropores between the compressed aggregate particles, ranging from about 25 to 50 millimicrons in diameter, depending upon the local perfection of packing of the aggregates.

It should be noted that in this situation, the aggregates must possess a certain degree of mechanical strength and the coalescence factor of the ultimate particles should be preferably greater than 10%. When such a molded and compressed body is sintered, the micropores within the aggregates disappear and the macropores between the aggregates remain as continuous channels. If the original aggregate particles are essentially all within the size range of 300 to 500 millimicrons diameter, or an average of 400 millimicrons, then the average distance between macropores after sintering will be of the same order of magnitude, diminished by the percentage of overall linear shrinkage during the final firing. By this means white, opaque, amorphous silica containing a uniform network of interconnecting channels around 50 millimicrons diameter, is obtained with transverse bending strength of the order of 25,000 p.s.i., in comparison with transparent, fused silica with a bending strength of 10,000 to 12,000 p.s.i.

The degree of coalescence of ultimate particles is expressed quantitatively in terms of the "coalescence factor." This coalescence factor is less than 30%. The coalescence factor is an indication of the extent to which the ultimate particles are joined together. In aggregates where the ultimate particles are very firmly joined together, so that they have substantial Si—O—Si linkages between the ultimates and cannot be compressed to compacts with small, uniform pores, the coalescence factor is considerably higher than 30%. The coalescence factor is well understood in the art and described, for instance, in United States Patent No. 2,731,326, issued January 17, 1956, to Guy B. Alexander.

The degree of coalescence, or "coalescence factor," is determined according to the method given in the just-mentioned United States patent at column 12, line 24 and the following. The method involves measuring the percentage transmission of light through the silica-water dispersion, measured with light having a wave length of 400 millimicrons.

This method is suitable for use with silica powders in which the average particle size of spheroidal amorphous silica particles is less than 50 millimicrons. If the silica particles are larger than this, light having a wave length of 700 millimicrons or larger should be used.

It should be understood that in the case of ultimate silicate particles larger than about 50 millimicrons, the degree of coalescence obtained in powders dried under conditions to minimize the degree of coalescence, such as drying from aqueous solution at a pH of about 2, or by freeze-drying in the absence of strong alkali, or by spray-drying, the degree of coalescence will generally be less than about 30%. In the case of particles larger than about 100 millimicrons, the degree of coalescence in the dry powder is of the order of 10% or less, when, for example, the sol is dried from aqueous solution at a pH of 2 or 3 with a volatile strong acid such as nitric or hydrochloric, and especially if normal propyl alcohol is added to the mixture in the last stages of drying, to minimize the surface tension of the evaporating liquid. It may be assumed that for particles larger than about 50 millimicrons in diameter, the aggregate powders prepared in accordance with the teachings of this invention will have a coalescence factor of less than 30%.

The molding powders have a "tapped" bulk density of at least 0.2 gram per cubic centimeter. "Tapped" density is measured by placing a weighed quantity of sample in a graduated cylinder, and tapping the cylinder until the volume is essentially constant. If the bulk density is less than this minimum, it will be found that the powders are extremely difficult to compact uniformly, and will give compacts having internal strains and in which stratification of the solids will be present.

The molding powders are substantially free of non-volatile impurities. The term "non-volatile" as here used means that the impurities will not distill out or burn out at the temperature of sintering—that is, in the range of 1000 to 1200° C.

MAKING USEFUL ARTICLES FROM MOLDING POWDERS

Useful articles of amorphous silica are made from the molding powders by compacting the powder under pressure to form an article of the desired shape and approximately the desired dimensions and then heating the compact at elevated temperatures.

Techniques for forming shaped articles from powders are well known in such arts as powder metallurgy and any of such techniques can be used for making articles from the molding powders of this invention. For instance, the powder may be evenly flowed into a steel mold or die and compacted with a plunger. Hydrostatic compaction around a mandrel or in a rubber mold which is squeezed by hydrostatic pressure can be employed for making cylindrical, hollow objects. Powders can be roll-formed into sheets or bars or can be extruded through a die to form rods.

The molded objects can be further shaped by cutting or machining either after the molding at room temperatures or after prefiring at temperatures below 1000° C. Usually the mechanical strength of the molded body is greatly improved by baking at temperatures ranging from 400 to 800° C. Such bodies can be drilled, turned on a lathe, or otherwise machined. The resulting shaped object will, of course, be considerably larger than the final sintered object, but since the shrinkage during sintering is essentially uniform in all directions, there is produced a miniaturized replica in which the absolute values of the linear dimensions are smaller than the originally machined dimensions, yet the relative dimensions are the same.

In the compaction step the pressure applied should be sufficient to produce a uniformly dense compact having a density of at least one gram per cubic centimeter after removal from the die.

If the pressure is released after compaction, this should be done as slowly as is required to avoid the setting up of internal strains within the compact.

The pressures involved in the compaction operation are in the order of from 1 to 20 tons per square inch (t.s.i.). At pressures lower than 1 t.s.i., the molding powder does not achieve a high enough formed density. Pressures higher than 20 t.s.i. have no advantage and have a disadvantage in that the very small amount of air entrapped in the powder and die is compressed so highly at these pressures that when the pressure is released the air expands rapidly, causing local dislocations and flaws. The articles formed by the pressing operation have considerable dry strength and can easily be handled without damage, especially in the case of powders in which the ultimate particles are 100 millimicrons in diameter or less. In the case of powders containing larger ultimate particles, the strength of the pressed but unfired articles becomes progressively weaker with increasing ultimate particle size, and considerable care must be exercised in handling these bodies. Nevertheless, the resistance to devitrification during firing improves as the specific surface area of the powder diminishes, or as the ultimate particle size increases. Consequently the weaker character of the molded bodies made from powders of larger ultimate particle size is compensated for in a practical way by the wider latitude permitted in the temperature at which the bodies must be fired to achieve high density without devitrification.

The molded bodies are placed into a furnace and heated at, for example, 50° C. per hour to 600° C. The volatile material will burn out as the samples are being heated to the firing temperature. It is important that the bodies not be heated suddenly or too rapidly to 600° C. while the volatile material is being removed and preferably not faster than 100° C. per hour up to 800° C.

The heating rate may be more rapid once the body has begun to sinter above 800 or 1000° C.

It will be apparent to one skilled in the art that the larger the molded body the more slowly it must be heated in order to permit the evolution of moisture without disrupting the molding. It is a further advantage of bodies molded from silica powders consisting of ultimate particles in the range from 100 to 300 millimicrons in diameter, that the evolved moisture or steam escapes from the molded mass more readily than when much finer ultimate particles are employed. At the same time it must be kept in mind that the molded bodies made with these coarser ultimate particles are weaker and less coherent. Generally speaking, the larger the size of the ultimate particles of which the original molding consists, the more rapidly the molded compact may be heated without danger of disintegration from the internal pressure of the evolved gases.

SINTERING THE COMPACT

The molded compacts are sintered by heating them at a relatively uniform rate until the sintering temperature, in the range between 1000° C. and the devitrification temperature of the silica is reached, and maintaining them at this temperature until their density is in the range of about 91% to about 100% of the theoretical density of amorphous silica. The novel character of the compacts makes it possible to sinter them to the desired density in this temperature range without devitrification.

The maximum sintering temperature is determined principally by the size of the ultimate spheroidal, colloidal silica particles in the molding powder. Very large colloidal particles, such as around 300 millimicrons in diameter, require a sintering temperature of around 1200 to 1300° C. Smaller colloidal particles, around 15 millimicrons in diameter, require a sintering temperature of around 1100° C., while particles from 5 to 10 millimicrons in diameter may be fired as low as 1000 to 1050° C. The exact firing time and temperature can be determined by experiment for each particular molding powder; as explained below the conditions depend among other factors on trace impurities.

On the other hand, large colloidal particles such as around 100 millimicrons or more in diameter, devitrify less readily than smaller particles such as 15 millimicrons in diameter. Thus, while the larger colloidal particles require a somewhat higher sintering temperature, they also possess some resistance to devitrification which makes this higher firing temperature feasible in producing non-devitrified amorphous silica bodies.

Both sintering rate and rate of devitrification increase with increasing amounts of moisture in the furnace atmosphere, and the amount of trace impurities in the silica.

It has been observed that devitrification begins primarily at the surface of colloidal particles and for a given firing temperature, bodies of smaller colloidal particles begin to devitrify sooner than bodies of larger particles. Thus, the rate of devitrification is primarily a surface phenomenon and depends upon the extent of silica surface present in the body and the trace impurities within the particles appear to accelerate the rate of sintering.

For any given molding powder, the time and temperature of sintering is determined by experiment, the temperature and time being that required to sinter the body to a density in the range of 91% to 100% of theoretical. Heating should not be continued after the desired density has been reached since further heating serves no useful purpose and increases the possibility of devitrification. Devitrification is generally observed on the cooled specimens in the form of microscopic, white or opaque, crystalline regions of cristobalite, which tend to crack away from the surrounding amorphous silica. Such regions invariably weaken the final body and thus devitrification must be avoided.

The novel anhydrous amorphous silica bodies of this invention having a density between 91 and 99% of theoretical have been found to possess outstanding strength in comparison with the ordinary fused silica bodies known in the art. The greatest strength is exhibited by bodies having a density in the range of 96 to 99% of theoretical and the optimum strength appears to be obtained at a density of about 97% of the theoretical density of amorphous silica.

Electron microscope inspection of these novel bodies reveals that the interconnecting macropores are evenly distributed throughout the bodies. These pores are generally tetragonal or triangular in shape. The size of a pore is the diameter of a circle of area equal to that of the pore cross-section. The pores are of such uniformity of size that at least 50% of the pores have a diameter of from 0.5D to 2.0D where D is the average pore diameter. Occasional large pores should be avoided and essentially no pores larger than 5D should be present. The actual size of the pores will depend upon the size of the silica aggregates in the molding powder used to prepare the body. In general, it can be said that in the final body essentially none of the pores will have a diameter exceeding half the average diameter of the aggregate particles in the molding powder used and in most cases the average maximum dimension of the pores will be around one-tenth the average diameter of the aggregates. Thus, for example, where a molding powder consisting of 200 millimicron ultimates and two micron aggregates is used, the resulting body will contain pores of which no more than about 1% will be larger than one micron in diameter and the average dimension of the pores will be about 0.1 micron. It will be understood that in bodies prepared from molding powders consisting of smaller aggregates the pores will be even smaller, down to a minimum of 20 millimicrons, but generally not smaller than 50 millimicrons.

The molded, sintered products are useful as ceramic materials, particularly wherever materials having chemical inertness and a low coefficient of thermal expansion and resistance to thermal shock are needed. Typical of these uses are in nose cones for missiles and in electrical insulators, kiln furniture, cooking ware and covers for electric stove heating elements. The pores may be sealed later if desired by surface fusion or impregnation with colloidal silica or sodium silicate solution and refiring at about 1000° C.

The invention will be better understood by reference to the following illustrative examples:

Example 1

A silica aquasol, prepared by the process of Example 3 of U.S. Patent No. 2,574,902, issued November 13, 1951, to Max F. Bechtold and Omar E. Snyder and containing silica particles having an average diameter of about 17 millimicrons, but using ammonia as the alkali-stabilizing agent, is diluted to 10% $SiO_2$ and deionized in accordance with the process of U.S. Patent No. 2,577,485, issued December 4, 1951, to Joseph M. Rule. One hundred parts by weight of this diluted sol are stirred for three hours with 10 parts by weight of the hydrogen form of a sulfonated polystyrene ion exchange resin, the resin is drained out, and the sol is then mixed with 10 parts by weight of a cation exchange resin in the hydrogen form and 10 parts by weight of an anion exchange resin in the hydroxyl form, to remove the last traces of anions and cations.

The deionized sol is filtered to remove traces of resin, and is spray-dried in a spray drier using two-fluid atomization. This type of drier is described in "The Chemical Engineer's Handbook," 3rd Edition, by John H. Perry, at page 840. The inlet temperature is 300° C. and the outlet temperature is 110° C. The dried powder is separated from the air stream in a cyclone-type separator and dust bag filter. The powder is stored out of contact with moisture.

The dried powder is molded by compaction into a bar by placing approximately 3 grams of it in a 2-inch-long, ¼-inch-wide steel die and pressing it with a corresponding plunger under a pressure of 10 tons per square inch (t.s.i.). This pressure is applied, held for one minute, then released slowly over a period of one minute. A coherent bar 2 inches long by ¼ inch wide and about ¼ inch thick having a density of about 1 gram per cubic centimeter is obtained. When removed from the die, the bar is sufficiently strong and coherent to be handled without disintegration and is essentially free from micropores. Care is taken not to damage the corners and edges during handling. Contamination of the bar with NaCl is avoided by handling only with clean gloves.

The bar is dried for twenty-four hours in an air oven at 50° C., to remove any residual water vapor. The dried bar is then placed on a pure silica support in an electrically heated muffle and heated from room temperature to 1200° C. at a rate of 50° C. per hour, then held at 1200° C. for two hours to sinter the silica particles. The sintered product is removed from the furnace and cooled by dropping it into water.

X-ray analysis indicates that the fired material is amorphous silica. Translucent specimens prepared in this manner have a density of over 99% of the theoretical density of pure fused amorphous silica as calculated from the dimensions and weight of the sample. The modulus of rupture is 5000 p.s.i., as measured by the conventional "transverse bend" technique of applying a measured increasing load at the middle of the bar which is supported across a 1-inch span.

*Example 2*

A dry, pulverulent silica powder is prepared by deionizing a 30% $SiO_2$, amorphous silica aquasol in which the silica particles have an average diameter of 15 millimicrons, with a mixture of cation exchange resin in the hydrogen form and anion exchange resin in the hydroxyl form, until its pH is 3.8 and its specific resistance is about 5000 ohms, and heating the deionized sol in an autoclave, the temperature being raised to 325° C. over a 4.5-hour period and held at 325° C. for five hours, whereby a 12% $SiO_2$ aquasol having a pH of 9.2 is obtained, deionizing the sol with cation exchange resin in the hydrogen form until the pH is 3.1, freeze-drying this sol, and vacuum-subliming off the water without melting the frozen product, whereby a dry, pulverulent silica having a surface area of 36 square meters per gram (corresponding to an average particle diameter of about 83 millimicrons) and a degree of coalescence of 1.5% is obtained, all as described more fully and as claimed in Example 1 of Alexander U.S. Patent 3,041,140.

The powder is pressed into bars, further dried, and heated to the sintering temperature, all as described in Example 1. The specimens are cooled by removing them from the furnace and dropping them into water.

The density of the fired silica ceramic is about 99% of theoretical and the modulus of rupture is 7500 p.s.i.

*Example 3*

A silica sol having an average particle diameter of 25 millimicrons is prepared in accordance with the process of Example 3 of the above-mentioned U.S. Patent No. 2,574,902. The sol is diluted to a concentration of 10% by weight of $SiO_2$, and then acidified to a pH of 1.5 with hydrochloric acid. After standing in this acid condition for twenty-four hours at room temperature, the mixture is deionized by adding, per 100 parts by weight of sol, 10 parts by weight of the hydrogen form of a cation exchange resin and 10 parts by weight of the hydroxyl form of an anion exchange resin, agitated slowly for two hours, and the mixture then filtered to remove the resin. The pH of the filtered sol is about 4.

This purified sol is then spray-dried as described in Example 1. The freshly dried powder is pressed into bars and tested, as in Example 1, with the exception that the material is sintered for ten hours at a temperature of 1130° C. The modulus of rupture of the resulting dense, amorphous silica is found to be as strong as clear fused silica.

*Example 4*

A 17% silica sol prepared in accordance with the process of Example 1 of U.S. Patent 2,750,345, issued June 12, 1956, to Guy B. Alexander, containing colloidal amorphous silica particles having an average diameter of 7 millimicrons, is diluted with water to a concentration of 4% by weight of $SiO_2$, acidified with nitric acid to a pH of 1.5, permitted to stand for six hours, then deionized with a mixture of the hydrogen and hydroxyl forms of ion exchange resins as described in Example 2, above. The resulting purified dilute sol has a pH of 3.7. It is then spray-dried by the method employed in Example 1, but the silica powder is removed continuously from the collecting cyclone and cooled to 0° C.

The freshly prepared powder, within an hour after being dried, is pressed into bars by the mehod described in Example 1, dried overnight at 50° C., and fired to a temperature of 1080° C. at the rate of 50° C. per hour and held at 1080° C. for six hours. The density of the bars is about 91% of theoretical yet is about as strong as fused amorphous silica.

*Example 5*

A 50% silica sol consisting of particles averaging 105 millimicrons in diameter is prepared by deionizing a 30% $SiO_2$, 15 millimicron-sized particle, amorphous silica aquasol by successive treatments with cation exchange resin in the hydrogen form and anion exchange resin in the hydroxyl form until the pH is 3.2, diluting the sol, heating it for eighty-seven hours at the temperature of the steam bath, and again deionizing with cation exchange resin to a pH of 3.05, autoclaving the resulting sol at 340° C. for six hours to give a sol product containing 10.6% $SiO_2$, having a pH of 8.0, and concentrating this sol by evaporation to 50% $SiO_2$ by weight.

This sol is freeze-dried by placing about 150 ml. in a 1.5-liter spherical glass flask, which is rotated in a freezing mixture of solid carbon dioxide and acetone. The frozen sol forms a solid layer on the walls of the flask. The flask is then connected with a high vacuum in a conventional freeze-drying apparatus, and the water is removed while the mass is still in a frozen state.

The dried powder is placed in a mold and subjected to a gradually increasing pressure of 25 tons per square inch over a period of three minutes and the pressure then gradually reduced over a period of one minute. The coherent, molded bar is further dried in air at 50° C. and then placed in an electrically heated muffle and heated to 800° C., while supported on a fused silica plate. Another electric muffle, adjacent to the first, is heated to a temperature of 1050° C. The silica bar, not yet sintered at 800° C. is quickly transferred to the muffle at 1050° C. and left for fifteen minutes. It is observed that the specimen shrinks perceptibly in dimensions, and becomes more translucent. As soon as this change occurs, which requires fifteen minutes at 1050° C., the specimen is removed from the furnace and cooled by dropping it into water.

The amorphous silica body has a density indistinguishable from that of fused silica and a modulus of rupture of 5500 p.s.i. It is so translucent as to be almost transparent in some regions. However, in areas where the cold, pressed bar is handled with the fingers prior to sintering, there are small, devitrified areas of the surface containing white, opaque, cristobalite crystals. It is apparent that contamination of the surface of the material, probably from sodium chloride absorbed from the fingers, causes some devitrification of the surface.

*Example 6*

Five liters of an ammonia-stabilized silica sol of the type described in Example 1, containing 5% silica, is deionized as described in Example 1. Concentrated nitric acid is added to the sol until the pH drops to 1.5. The acidified sol is allowed to stand overnight. An anionic exchange resin in the hydroxyl form is then added to the sol until the pH is raised to 2. The resin is filtered from the sol. A 50–50 by volume mixture of cationic and anionic exchange resins is added to the sol until the pH cannot be raised any more. The mixture is stirred for twenty-five minutes. The pH at this point is 3.5. The resins are filtered from the sol. This procedure removes the alkali from the interior of the silica particles. Four cubic centimeters of concentrated nitric acid is added to the purified sol to increase its stability toward gelation.

The sol is diluted to 1% silica with distilled water and spray-dried as described in Example 1. The molding powder resulting is found to contain 5.8% water, 0.035% sodium, 0.33% non-siliceous ash. It has a coalescence factor of 24% and a aggregate size of approximately 2 microns.

The molding powder is compacted as described in Example 1. The density of the compact is 1.1 grams per cubic centimeter. The samples are fired by heating to 1200° C. at 100° C. per hour. The samples are held at this temperature for various lengths of time and quenched from 1200° C. into cold water. The following table shows the densities and transverse bend strengths of samples following quenching after various hold times at temperature.

| Hold time at 1,200° C., hrs. | Density, Percent of Theoretical* | Transverse Bend Strength, p.s.i. |
| --- | --- | --- |
| ½ | 94 | 5,000 |
| 1 | 97 | 8,200 |

*Actual density (g./cc.) as calculated from weight and dimensions divided by 2.2 (theoretical density of amorphous silica) and multiplied by 100.

*Example 7*

An eighteen-kilogram portion of an ammonia-stabilized silica sol of the type described as the starting material in Example 1, containing 1.5% silica, is deionized as in Example 1. The sol is spray-dried in the drier described in Example 1, at the conditions described in that example. The total time for drying the entire sol is 147 minutes, although the drying rate for any given amount being sprayed is practically instantaneous.

The resulting molding powder is found to have the following properties:

2.7% water
0.3% total sodium as Na
0.30% non-siliceous ash
Coalescence factor=20%
Aggregate size=1.3 microns The powder is compacted into bars as described in Example 1. The density after compaction is 1.1 gram per cubic centimeter.

The samples are fired by heating to 1200° C. at 100° C. per hour. The samples are held at temperature for various lengths of time and quenched from 1200° C. into cold water. The following table shows the densities and transverse bend strengths of the samples after quenching after various hold times at temperature:

| Hold time at 1,200° C. hrs. | Density percent of Theoretical | Transverse Bend Strength, p.s.i. |
| --- | --- | --- |
| ¼ | 91 | 9,300 |
| 2 | 96 | 9,400 |

*Example 8*

Six liters of an ammonia-stabilized silica sol of the type described in Example 1, containing 10% silica, is deionized as described in Example 1. The sol is then spray-dried in the drier described in Example 1.

The following are the operating data:

Drying air temperatures—350° C.
Drying air rate—166#/hour
Atomizing air temperature—340° C.
Atomizing air rate—72#/hour
Nozzle cooling air rate—15#/hour
Quench air rate—140#/hour
Drying atomizing nozzle cooling and quench air pressure—75 p.s.i.g.

The total sol is dried in approximately fifty minutes, the rate of drying of the sol droplets after spraying being substantially instantaneous. The exit air temperature during the drying is 110° C.

The powder is found to contain approximately 2.5% water by Fischer titration, 0.03% sodium, 0.23% non-siliceous ash. It has a coalescence factor of 23%. The aggregate size is approximately 1.5 microns, as observed in the electron microscope.

The molding powder described above is compacted as described in Example 1. The density of the sample is 1.1 grams per cubic centimeter after compacting at 10 t.s.i. The compacted samples are fired by heating to 1200° C. at 100° C. per hour. The samples are held at temperature for various lengths of time and quenched from 1200° C. into cold water. The following table shows the densities and transverse bend strengths of the samples after quenching after various hold times at the stated temperature.

| Hold time at 1,200° C. hrs. | Density percent of Theoretical | Transverse Bend Strength, p.s.i. |
| --- | --- | --- |
| 1 | 91 | 9,000 |
| 3 | 95 | 11,000 |

*Example 9*

Fifteen hundred grams of an ammonia-stabilized silica sol of the type described in Example 1 containing 30% silica is deionized, as in Example 1, and the sol is spray-dried in the drier of that example. The conditions for this drying are as follows:

Drying air temperature—354° C.
Drying air rate—166#/hour
Atomizing air temperature—400° C.
Atomizing air rate—87#/hour
Nozzle cooling air rate—10#/hour
Quench air rate—110#/hour The sol is dried in ten minutes. The exit air temperature is 135° C.

The resulting molding powder is found to contain 2% water, 0.032% sodium, 0.15% non-siliceous ash. It has a coalescence factor of 26%. The aggregate size is 2.5 microns.

The molding powder is compacted as described in Example 1. The density of the compact is 1.04 grams per cubic centimeter. The samples are fired by heating to 1200° C. at the rate of 100° C. per hour. They are held at temperature for various lengths of time and quenched from 1200° C. into cold water. When held at 1200° C. for three hours the samples are 97% of theoretical density and have a transverse bend strength after quenching of 9000 p.s.i.

*Example 10*

One liter of an ammonia-stabilized silica sol of the type described in Example 1, containing 30% silica, is allowed to dry in air at room temperature. The gel obtained is pulverized to particles smaller than half a millimeter in diameter and dried in a vacuum oven at 110° C. overnight.

One hundred grams of the dry silica powder are placed in a two quart vented steel mill half filled with low-carbon steel balls, one-quarter of an inch in diameter, and containing 500 cc. of water. The powder is ballmilled for five days at 80 r.p.m., water being added as necessary to keep the mixture semi-fluid.

After the milling operation the paste is removed from the mill, separated from the steel balls and treated with warm aqua regia until all metal worn from the balls is dissolved. The silica is then washed with 1% hydrochloric acid until all the iron is separated. This treatment also thoroughly eliminates sodium as well as other metal ions, leaving a pure white silica suspension. The treatments and washing operations are carried out by suspending the silica in the reagents, or the wash water and then permitting it to settle out of the liquid which is then drawn off.

The silica paste is finally washed with distilled water until the wash water is free from chloride ion, and adjusted to pH 9 with ammonia. The aqueous suspension is diluted to a volume of one liter and allowed to settle in a container filled to a depth of 50 centimeters for 3 hours and the liquid from the top 20 cm. is removed. This fraction contains only silica aggregates of about 0.5 micron equivalent diameter and smaller.

The residue is reslurried as before with more water, and again allowed to settle. The liquid from the top 20 cm. is again extracted and combined with the fraction form the first operation. This suspension is then placed in a container to a depth of 20 centimeters and permitted to settle for 3 hours and the upper 10-centimeter layer is discarded and the residue rediluted and the operation repeated. These combined fractions are then dried on a steam bath and the residue obtained further dried in a vacuum oven at 75° C. overnight.

The powder is made of aggregates from 0.5 micron to 0.35 micron in diameter. Several batches of this material are prepared by processing an additional 100 gram lot of dried silica.

The powder is compacted as described in Example 1. The density of the sample is about one gram per cubic centimeter after being compacted at 10 tons per square inch. The compacted samples are sintered by heating to 1100° C. at 100° C. per hour. The samples are held at temperature for 5 hours and quenched from 1100° C. into water at room temperature. Slight variations from and spray-dried following the method described in Example 1.

The freshly dried powder has a specific surface area of 175 m.$^2$/g. and a coalescence factor of 24.5. Analysis by flame photometry shows a sodium content of 0.03%. Spectrographic analysis gives the following results:

|  | Parts per million |
|---|---|
| Iron | 150 to 750 |
| Aluminum | 150 to 750 |
| Nickel | 50 to 250 |
| Zirconium | 500 to 2500 |
| Titanium | 200 to 1000 |
| Copper | 3 to 15 |
| Magnesium | 25 to 250 |
| Boron | 20 to 100 |
| Calcium | 20 to 100 |

The bulk density of this powder is 0.65 g./cc. Electron microscopy inspection of this powder shows spheroidal aggregates with an average diameter of about 0.6 micron.

Different portions of the powder are molded by compaction at room temperature at 10, 15 and 20 tons per square inch pressure into 2-inch-long, ¼-inch-wide bars following the procedure indicated in Example 1.

The bars are placed on pure silica supports and distributed along the length of an electrically heated muffle and heated from room temperature to 1100° C. at a rate of 50° C. per hour, then held at 1100° C. for five hours. The sintered bars are removed from the furnace and cooled by dropping them into water.

The table below shows the densities and transverse bend strengths of samples removed from various parts of the muffle.

It is to be observed that the values in the Table for Apparent Specific Gravity, T, are only approximate. For a fused silica completely devoid of porosity or for a body containing only open pores, the T value should be 2.2, i.e. the theoretical density of silica. However, even for such a body the measured T value may be something less than 2.2, say 2.18 or 2.19. Thus, it is not possible to determine from the T values in the table whether the bodies actually contain a small amount of closed porosity. The T values less than 2.20 may be the result of impreciseness of the experimental method.

However, on the assumption that a T value below 2.20

| Compaction Pressure, 25° C. (t.s.i.) | Position in the Muffle | T, g./cc.[1] | B, g./cc.[2] | P, Percent [3] | Transverse Bend, p.s.i. | Max. Percent Closed Porosity |
|---|---|---|---|---|---|---|
| 10 | Back, left hand side (a) | 2.19 | 2.13 | 2.94 | 8,300 | 15 |
| 10 | Back, left hand side (b) | 2.19 | 2.13 | 2.74 | 4,600 | 15 |
| 10 | Back, right hand side (c) | 2.19 | 2.04 | 6.92 | 10,000 | 7 |
| 10 | Back, right hand side (d) | 2.18 | 2.10 | 3.61 | 9,000 | 22 |
| 20 | Center, right hand side (e) | 2.18 | 2.17 | 0.5 | 5,000 | 70 |
| 10 | Center, left hand side (f) | 2.19 | 2.09 | 4.34 | 16,000 | 10 |
| 15 | Front, right hand side (g) | 2.19 | 2.13 | 2.63 | 20,000 | 15 |
| 10 | Front, left hand side (h) | 2.18 | 2.03 | 6.9 | 12,000 | 13 |

[1] The Apparent Specific Gravity, T, of that portion of the test specimen which is impervious to boiling water (ASTM method C20–46).
[2] The bulk density, B, in grams per cubic centimeter of a specimen is the quotient of its dry weight divided by the exterior volume, including pores. (ASTM method C20-46.)
[3] The Apparent Porosity, P, expresses as a percentage the relationship of the volume of the pores of the specimen to its exterior volume.

batch to batch of powder require that the exact firing temperature for each batch to achieve the desired density be determined in a preliminary test.

The white, opaque bodies fabricated in this manner have a density of 95 to 98% of theoretical and contain interconnected channels of uniformly sized pores of 50-millimicron average diameter, distributed throughout the dense amorphous silica matrix. These bodies are over twice as strong as optical grade fused silica, as measured by transverse bend tests on specimens of equal size cut in the same way by diamond sawing.

*Example 11*

The silica aquasol of Example 1 is diluted, deionized is the result of presence of closed pores, the maximum possible closed porosity as a percent of total porosity is calculated as follows:

$$\text{Percent closed porosity} = \frac{1 - T/2.20}{1 - B/2.20} \times 100$$

The values of maximum percent closed porosity for the bars of this example are given in the table.

It is apparent that in all of the bars except possibly sample (e) the major proportion of the porosity is present in the form of interconnected pores which form channels throughout the bars.

Electron microscope inspection of a film replica of a polished surface of each of the bars, as well as direct transmission electron micrographs of thin sections of each bar, reveals that these channels are evenly distributed throughout the bars. The channels are generally tetragonal or triangular in shape and have a diameter (calculated as the diameter of a circle having the same area as the pore cross section) of from about 0.1 to 0.5 micron. The pores are of such uniformity of size that practically no pores smaller than 0.1 micron or larger than one micron are found in the bars.

The invention claimed is:

1. A process for making amorphous silica bodies having a density of from 91 to 100% of the theoretical density of amorphous silica which comprises the steps (1) compacting under pressure to a uniform density of at least about 1 gram per cubic centimeter a powder consisting essentially of aggregates of amorphous silica ultimate particles substantially free of non-volatile constituents other than silica, said aggregates having a particle size in the range from 0.1 to 50 microns, said powder having a tapped bulk density of at least 0.2 gram per cubic centimeter, the ultimate amorphous silica particles being spheroidal and substantially uniform in size as observed by electron microscopy, being dense, having a coalescence factor of less than about 30% and having an average diameter of from 5 to 300 millimicrons; (2) releasing the pressure and then heating the compacted material at a temperature above 1000° C. but below the devitrification temperature of the material until the density of the resulting body is increased to at least 2.0 grams per cubic centimeter; (3) cooling the body before any cristobalite is formed by devitrification of the amorphous silica.

2. A process as defined in claim 1 wherein the ultimate amorphous silica particles have an average diameter of from 5 to 200 millimicrons.

3. A process for making strong amorphous silica bodies containing interconnected macropores uniformly distributed throughout the bodies which comprises the steps (1) compacting under pressure to a uniform density of at least about 1 gram per cubic centimeter a powder consisting essentially of aggregates of amorphous silica ultimate particles substantially free of non-volatile constituents other than silica, said aggregates having a particle size in the range from 0.1 to 50 microns, said powder having a tapped bulk density of at least 0.2 gram per cubic centimeter the ultimate amorphous silica particles being spheroidal and substantially uniform in size as observed by electron microscopy, being dense, having a coalescence factor of from 10 to 30%, and having an average diameter of from 5 to 300 millimicrons, the average diameter of the aggregates being at least 10 times the average of the ultimate amorphous silica particles, the compaction of the powder being stopped while spaces still remain between the aggregates, these spaces having an average diameter of at least twice that of the diameter of the ultimate silica particles; (2) releasing the pressure and then heating the compacted material at a temperature above 1000° C. but below the devitrification temperature of the material until the density of the resulting body is in the range from 91 to 99% of the theoretical density of amorphous silica; (3) cooling before any cristobalite is formed by devitrification of the amorphous silica.

4. A process as defined in claim 3 wherein the ultimate amorphous silica particles have an average diameter of from 5 to 200 millimicrons.

5. A a process for making translucent anhydrous amorphous silica bodies substantially free from crystalline silica and substantially free from porosity, the density of the bodies ranging from 99 to 100% of the density of amorphous silica which comprises the steps (1) compacting under pressure a powder consisting essentially of aggregates of amorphous silica ultimate particles substantially free of non-volatile constituents other than silica, said aggregates having a particle size in the range from 0.1 to 50 microns, said powder having a tapped bulk density of at least 0.2 gram per cubic centimeter, the ultimate amorphous silica particles being spheroidal and substantially uniform in size as observed by electron microscopy, being dense, having a coalescence factor of less than about 30% and having an average diameter of from 5 to 300 millimicrons, the compaction of the powder being continued until there remain essentially no spaces between the aggregates; (2) releasing the pressure and then heating the compacted material at a temperature above 1000° C. but below the devitrification temperature of the material until a dense, translucent amorphous silica body having a density greater than 99% of theoretical is obtained; (3) cooling the body before any cristobalite is formed by devitrification of the amorphous silica.

6. A process as defined in claim 5 wherein the ultimate amorphous siilca particles have an average diameter of from 5 to 200 milimicrons.

7. The process of claim 5 wherein the powder aggregates consist of ultimate silica particles having a coalescence factor of less than 10%.

8. An opaque anhydrous amorphous silica body having a strength greater than that of 100% dense, transparent amorphous silica and being characterized by being substantially free of crystalline silica and non-volatile constituents other than silica, having a density of from 91 to 99% of the theoretical density of amorphous silica, the major proportion of the porosity being in the form of interconnecting macropores of from 20 to 5000 millimicrons in average diameter, the pores being of such uniform size that at least 50% have a diameter between 0.5 and 2.0 times the average pore diameter and essentially no pores are more than 5 times the average diameter, the pores being uniformly distributed throughout the body as observed by electron microscopy.

9. An opaque anhydrous amorphous silica body as defined in claim 8 wherein the interconnected macropores have an average diameter between 40 and 1000 millimicrons.

10. An opaque anhydrous amorphous silica body as defined in claim 9 having a density of from 95 to 98% the theoretical density of amorphous silica.

11. An opaque anhydrous amorphous silica body as defined in claim 10 consisting of at least 99.4% pure silica.

12. An opaque anhydrous amorphous silica body as defined in claim 11 in which the interconnected macropores have an average diameter between 100 and 500 milimicrons.

13. A process as defined in claim 3 wherein the powder aggregates are spheroidal in shape.

14. An amorphous silica powder consisting essentially of aggregates of dense amorphous silica ultimate particles substantially free from non-volatile constituents other than silica, the aggregates being spheroidal in shape, substantially uniform in size, and having an average diameter of between 0.5 and 50 microns, the powder having a tapped bulk density greater than 0.2 gram per cubic centimeter, the ultimate particles being spheroidal and substantially uniform in size as observed by electron microscopy, being dense, having a coalescence factor of less than 30% and having an average diameter of at least 5 but less than 50 millimicrons.

References Cited by the Examiner

UNITED STATES PATENTS

| | | | |
|---|---|---|---|
| 2,114,123 | 4/1938 | Heuser | 23—182 |
| 2,561,304 | 7/1951 | Hazel | 23—182 |
| 2,731,326 | 1/1956 | Alexander et al. | 23—182 |
| 3,041,140 | 6/1962 | Alexander et al. | 23—182 |
| 3,070,426 | 12/1962 | Winyall | 23—182 |
| 3,116,137 | 12/1963 | Vasilos et al. | 23—182 |

OSCAR R. VERTIZ, *Primary Examiner.*

R. M. DAVIDSON, A. GREIF, *Assistant Examiners.*